(12) United States Patent
Zhang et al.

(10) Patent No.: US 12,035,320 B2
(45) Date of Patent: Jul. 9, 2024

(54) SIGNAL TRANSMISSION METHOD AND APPARATUS, SIGNAL RECEPTION METHOD AND APPARATUS AND COMMUNICATION SYSTEM

(71) Applicant: FUJITSU LIMITED, Kawasaki (JP)

(72) Inventors: Guoyu Zhang, Beijing (CN); Qinyan Jiang, Beijing (CN); Meiyi Jia, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 391 days.

(21) Appl. No.: 17/241,325

(22) Filed: Apr. 27, 2021

(65) Prior Publication Data

US 2021/0250921 A1 Aug. 12, 2021

Related U.S. Application Data

(63) Continuation of application No. PCT/CN2018/113839, filed on Nov. 2, 2018.

(51) Int. Cl.
*H04W 72/23* (2023.01)
*H04L 5/00* (2006.01)
*H04W 56/00* (2009.01)

(52) U.S. Cl.
CPC ........... *H04W 72/23* (2023.01); *H04L 5/0005* (2013.01); *H04W 56/0015* (2013.01)

(58) Field of Classification Search
None
See application file for complete search history.

(56) References Cited

U.S. PATENT DOCUMENTS

| 2017/0245272 A1 | 8/2017 | Li et al. |
| 2018/0295590 A1 | 10/2018 | Abedini et al. |

(Continued)

FOREIGN PATENT DOCUMENTS

| CN | 107205277 A | 9/2017 |
| CN | 108024310 A | 5/2018 |

(Continued)

OTHER PUBLICATIONS

Notice of Preliminary Rejection issued by the Korean Intellectual Property Office for corresponding Korean Patent Application No. 10-2021-7012611, dated May 25, 2022, with an English translation.

(Continued)

*Primary Examiner* — Walter J Divito
(74) *Attorney, Agent, or Firm* — Myers Wolin, LLC

(57) ABSTRACT

A signal transmission method and apparatus, a signal reception method and apparatus and a communication system. The signal transmission apparatus is provided in a network device and includes: a transmitting unit configured to transmit indication information indicating that one information block of at least one information block transmitted by the network device within a time interval is transmitted at one candidate resource in at least two candidate resources within the time interval. The transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

5 Claims, 12 Drawing Sheets

(56) References Cited

U.S. PATENT DOCUMENTS

| | | | |
|---|---|---|---|
| 2019/0261255 A1 | 8/2019 | You | |
| 2019/0349170 A1 | 11/2019 | Li et al. | |
| 2020/0022185 A1 | 1/2020 | Luo et al. | |
| 2023/0254082 A1* | 8/2023 | Kwak | H04W 72/23 370/329 |

FOREIGN PATENT DOCUMENTS

| | | |
|---|---|---|
| CN | 108347778 A | 7/2018 |
| CN | 108513361 A | 9/2018 |
| CN | 108668366 A | 10/2018 |

OTHER PUBLICATIONS

Interdigital Inc., "Initial Access and Mobility Procedures in NR-U", Agenda Item: 7.2.2.4.2, 3GPP TSG-RAN WG1 Meeting #94bis, R1-1811205, Chengdu, China, Oct. 8-12, 2018.

International Search Report and Written Opinion of the International Searching Authority issued by the State Intellectual Property Office of the P. R. China for corresponding International Patent Application No. PCT/CN2018/113839, dated Jul. 8, 2019, with an English translation.

CATT, "Summary of Offline Discussion on RMSI", Agenda Item: 7.1.1.2.2, 3GPP TSG-RAN WG1 Meeting #93, R1-1807811, revision of R1-1807735, Busan, Korea, May 21-25, 2018.

Extended European search report with the Supplementary European search report and the European search opinion, Issued by the European Patent Office for corresponding European Patent Application No. 18938584.2-1215, dated Oct. 26, 2021.

Samsung, "Initial Access and Mobility Procedure for NR-U", Agenda Item: 7.2.2.4.2, 3GPP TSG-RAN WG1 Meeting #94bis, R1-1810861, Chengdu, China, Oct. 8-12, 2018.

Qualcomm Incorporated, "Initial access and mobility procedures for NR unlicensed", Agenda Item: 7.2.2.4.2, 3GPP TSG-RAN WG1 Meeting #94bis, R1-1811253, Chengdu, China, Oct. 8-12, 2018.

Mediatek Inc. "On initial access procedure and mobility in NR-U", Agenda item: 7.2.2.4.2, 3GPP TSG-RAN WG1 Meeting #94bis, R1-1810443, Chengdu, China, Oct. 8-12, 2018.

First Notification of Office Action and Search Report issued by the China National Intellectual Property Administration for corresponding Chinese Patent Application No. 201880098933.5, dated Jun. 1, 2023, with an English translation.

Notice of Reasons for Refusal issued by the Japan Patent Office for corresponding Japanese Patent Application No. 2021-523079, dated May 24, 2022, with an English translation.

Huawei et al., "Initial access in NR unlicensed", Agenda Item: 7.2.2.4.2, 3GPP TSG-RAN WG1 Meeting #94bis, R1-1810127, Chengdu, China, Oct. 8-12, 2018.

Xiaomi, "On SSB transmission in NR unlicensed", Agenda Item: 7.2.2.4.2, 3GPP TSG-RAN WG1 Meeting #94bis, R1-1811416, Chengdu, China, Oct. 8-12, 2018.

Examination Report issued by the Patent Office of India for corresponding Indian Patent Application No. 202137018348, dated Feb. 16, 2022, with an English translation.

Second Notification of Office Action and Search Report issued by the China National Intellectual Property Administration for corresponding Chinese Patent Application No. 201880098933.5, dated Dec. 21, 2023, with an English translation.

Notice of Reasons for Refusal issued by the Japan Patent Office for corresponding Japanese Patent Application No. 2022-208829, dated Dec. 19, 2023, with an English translation.

LG Electronics, "Initial access and mobility for NR unlicensed operation", Agenda Item: 7.2.2.4.2, 3GPP TSG-RAN WG1 Meeting #94bis, R1-1810270, Chengdu, China, Oct. 8-12, 2018.

Decision of Rejection issued by the China National Intellectual Property Administration for corresponding Chinese Patent Application No. 201880098933.5, mailed on May 14, 2024, with an English translation.

* cited by examiner

401 the network device transmits indication information indicating that one information block of at least one information block transmitted by the network device within a time interval is transmitted at one candidate resource in at least two candidate resources within the time interval

SIGNAL TRANSMISSION METHOD AND APPARATUS, SIGNAL RECEPTION METHOD AND APPARATUS AND COMMUNICATION SYSTEM

CROSS-REFERENCE TO RELATED APPLICATION

This application is a continuation application of International Application PCT/CN2018/113839 filed on Nov. 2, 2018 and designated the U.S., the entire contents of which are incorporated herein by reference.

TECHNICAL FIELD

This disclosure relates to the field of communication technologies, and in particular to a signal transmission method and apparatus, a signal reception method and apparatus and a communication system.

BACKGROUND

In the related art, a synchronization signal/physical broadcast channel block (SS/PBCH Block, SSB) may have a primary synchronization signal (PSS), a secondary synchronization signal (SSS) and a physical broadcast channel (PBCH).

In a time interval, a network device may transmit multiple SSBs via beams in different directions, thereby increasing a coverage angle of a cell.

After receiving the SSBs, the terminal may perform time-frequency synchronization during an initial access phase by using the SSBs, and may also perform radio resource management (RRM) and/or radio link monitoring (RLM).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

When a network device transmits multiple SSBs in a time interval, the SSBs may be transmitted at a default resource in the time interval. The time interval is, for example, a half-frame, and a length of the time interval is, for example, 5 milliseconds (ms).

FIG. 1 is a schematic diagram of default transmission resources of SSBs in a half-frame. In FIG. 1, it is assumed that a subcarrier spacing is 30 kHz and a carrier frequency is less than 3 GHz, in which case the network device transmits total 4 SSBs in a half-frame, namely, SSB1, SSB2, SSB3, SSB4, in which 1, 2, 3 and 4 are respective index values of the SSBs; initial transmission resources of the SSBs are symbol 2 of slot 0, symbol 8 of slot 0, symbol 2 of slot 1 and symbol 8 of slot 1 in the half-frame, respectively, and the network device transmits the SSBs in an ascending order of the index values. According to FIG. 1, there exists a default correspondence between the index values of the SSBs and slot indices and symbol indices.

In an initial access phase, a terminal equipment blindly detects the SSBs. When an SSB is detected, a slot index and a symbol index are obtained via an index value of the SSB according to a subcarrier spacing and a default time-frequency resource position of the index value of the SSB. And furthermore, a system frame number is obtained via a PBCH in the SSB, hence, the terminal equipment may obtain downlink time synchronization.

In using an unlicensed frequency band for communication, the network device needs to perform listen before talk (LBT) before transmitting data, so as to detect whether a channel is idle. The data may be transmitted when a detection result is that the channel is idle, and a transmitting device needs to detect again if the channel is busy, and until the channel is idle, the data may be transmitted by using the unlicensed frequency band.

It was found by the inventors of this disclosure that in a scenario where LBT is performed, a process of transmitting SSBs will face some new situations that need to be taken into account.

FIG. 2 is a schematic diagram of transmitting SSBs in case of LBT. As shown in FIG. 2, if a channel is busy before a default transmission resource of an SSB, that is, the LBT fails, the SSB is unable to be transmitted at a default time. And when the LBT is successful, a transmission resource after the LBT may be used for transmitting SSBs.

For example, in FIG. 2, a cell has total 4 SSBs, namely, SSB1, SSB2, SSB3 and SSB4. The transmission resources 201, 202, 203 and 204 in FIG. 2 are default transmission resources of SSB1, SSB2, SSB3 and SSB4, respectively, and the LBT fails before transmission resources 201 and 202. Therefore, transmission resources 201 and 202 are unable to be used to transmit SSB1 and SSB2; and the LBT is successful before transmission resource 203, therefore, transmission resources 203 and 204 are able to be used to transmit the SSBs.

It was found by the inventors of this disclosure that on the one hand, if transmission resources 203 and 204 in FIG. 2 are used to transmit SSB3 and SSB4, SSB1 and SSB2 are unable to be transmitted, that is, SSB transmission is incomplete, which will result in users within the coverage of beams used for transmitting SSB1 and SSB2 to be unable to receive an SSB and thus unable to access to the cell, and for users in a connected state, incomplete transmission of SSBs of a cell will result in incorrect calculation of quality of the cell, which will finally affect a result of cell reselection; and on the other hand, if all SSBs of the cell, that is, SSB1, SSB2, SSB3, SSB4, are sequentially transmitted by using transmission resources 203, 204 and subsequent resources, a default correspondence between SSB indices and transmission resources will be changed, that is, transmission resource 203 is used for transmitting SSB3 according to the default correspondence, but in order to transmit all the SSBs, transmission resource 203 is used for transmitting SSB1, which makes the terminal equipment hard to acquire downlink synchronization according to the above default correspondence in the initial access procedure.

Embodiments of this disclosure provide a signal transmission method and apparatus, a signal reception method and apparatus and a communication system, in which transmission resources of information blocks are indicated by indication information, hence, even though a default correspondence between information block indices and transmission resources is to be changed, transmission resources to which the information blocks correspond may be determined, and the terminal equipment is facilitated in downlink synchronization.

According to a first aspect of the embodiments of this disclosure, there is provided a signal transmission apparatus, provided in a network device, the apparatus including:

a transmitting unit configured to transmit indication information indicating one candidate resource in at least two candidate resources within a time interval, wherein, one information block of at least one information block transmitted by the network device within the time interval is transmitted at the one candidate resource in at least two candidate resources.

According to a second aspect of the embodiments of this disclosure, there is provided a signal reception apparatus, provided in a terminal equipment, the apparatus including: a receiving unit configured to receive indication information by the terminal equipment, the indication information indicating one candidate resource in at least two candidate resources within a time interval, wherein, one information block transmitted by the network device is transmitted at the one candidate resource; and a calculating unit configured to obtain time synchronization according to the indication information.

According to a third aspect of the embodiments of this disclosure, there is provided a communication system, including a terminal equipment and a network device, the network device including the transmission apparatus as described in the first aspect, and the terminal equipment including the reception apparatus as described in the second aspect.

An advantage of the embodiments of this disclosure exists in that the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1:
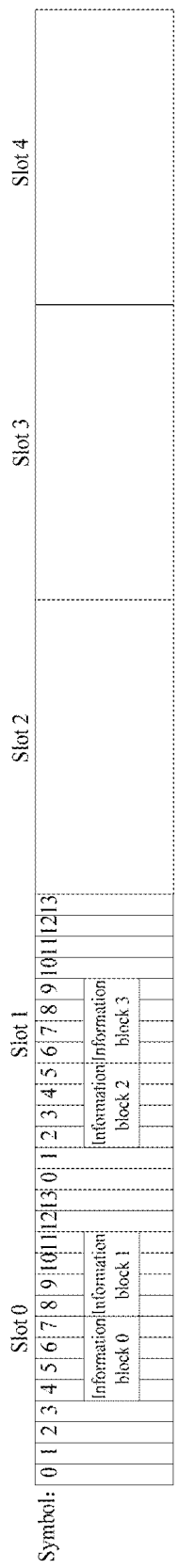
FIG. 1 is a schematic diagram of default transmission resources of SSBs in a half-frame.
Figure 2:
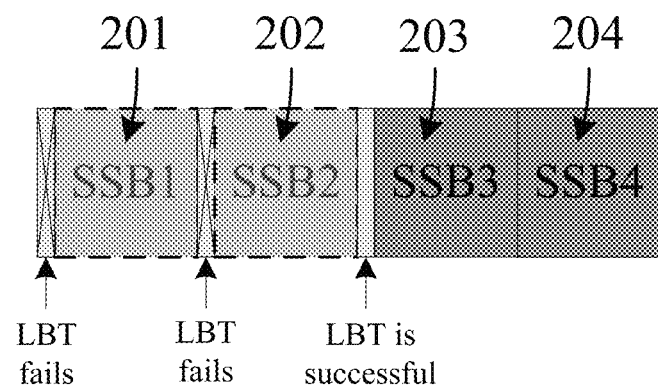
FIG. 2 is a schematic diagram of transmitting SSBs in case of LBT.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims. Various embodiments of this disclosure shall be described below with reference to the accompanying drawings. These embodiments are exemplary only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, an equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 3:
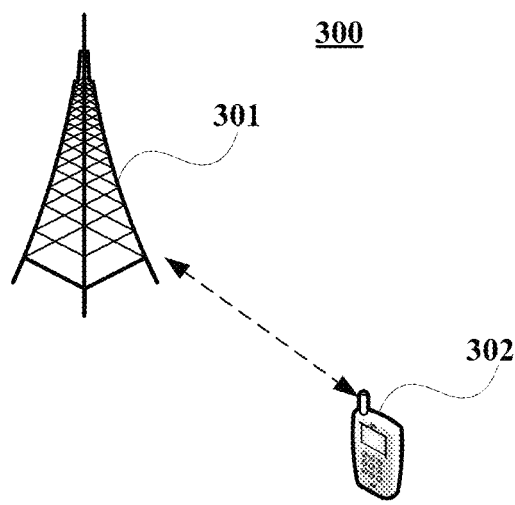
FIG. 3 is a schematic diagram of a communication system of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302 (for the sake of simplicity, description is given in FIG. 3 by taking one terminal equipment as an example).

In the embodiment of this disclosure, existing traffics or traffics that may be implemented in the future may be performed between the network device 301 and the terminal equipment 302. For example, such traffics may include but not limited to an enhanced mobile broadband (eMBB), massive machine type communication (MTC), and ultra-reliable and low-latency communication (URLLC), etc.

The terminal equipment 302 may transmit data to the network device 301, for example, in a grant or grant-free transmission manner. The network device 301 may receive data transmitted by one or more terminal equipments 302, and feed back information, such as acknowledgement/non-acknowledgement (ACK/NACK) information) to the terminal equipment 302. The terminal equipment 302 may acknowledge the end of a transmission process according to the feedback information, or may perform new data transmission, or perform data retransmission.

Furthermore, before the terminal equipment 302 accesses to the network device 301, the network device 301 may transmit information related to system information to the terminal equipment 302, and the terminal equipment 302 detects the received information to achieve downlink synchronization, and establishes connection with the network device 301.

Following description shall be given by taking that a network device is a transmitter end and a terminal equipment is a receiver end in a communication system as an example. However, this disclosure is not limited thereto, and the transmitter end and/or the receiver end may also be other devices. For example, this disclosure is application to not only signal transmission between a network device and a terminal equipment, but also signal transmission between two terminal equipments.

Embodiment 1

Embodiment 1 of this disclosure provides a signal transmission method, which may be carried out by a network device.

Figures 4, 5:
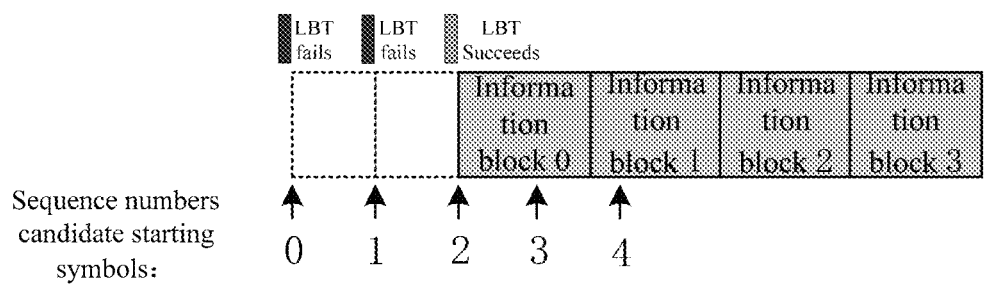
FIG. 4 is a schematic diagram of the signal transmission method.
FIG. 5 is a schematic diagram of candidate starting symbols in a first implementation.

FIG. 4 is a schematic diagram of the signal transmission method. As shown in FIG. 4, the method includes:
  step 401: the network device transmits indication information indicating one candidate resource in at least two candidate resources within a time interval, one information block of at least one information block transmitted by the network device within the time interval is transmitted at the one candidate resource.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

In this embodiment, a time interval is, for example, a half frame, the length of the time interval is, for example, 5 millisecond.

In this embodiment, an information block may include at least a synchronization signal/physical broadcast channel block (SS/PBCH Block, SSB). For example, the information block may be an SSB: or, in addition to the SSB, the information block may also contain other information. For example, the other information may be control resource set 0 and/or a physical layer shared channel carrying system information block 1 (SIB1).

In this embodiment, an information block group including a predetermined number of information blocks that the network device needs to transmit in the time interval of a cell is referred to as an information block group of the cell. The predetermined number is a default value, or a value determined by a subcarrier spacing and/or a carrier frequency. For example, when the subcarrier spacing is 15 kHz and the carrier frequency is less than 3 GHz, the information block group may include 4 information blocks, index values of the SSBs in each information block being different from each other. In addition, the index values of the information blocks may be or may not be equal to index values of the SSBs in the information block.

In this embodiment, the network device may use an unlicensed frequency band for communication. For example, the network device performs LBT detection before transmitting the information block in the time interval, and starts to transmit the information block group after the LBT is successful.

In one implementation, the network device completely transmits the information block group or does not transmit the information block within a time interval, that is, after the LBT is successful, all information blocks in the information block group are transmitted, and if all the information blocks in the information block group are unable to be transmitted completely, the information block is not transmitted. For example, an information block group of a cell contains 4 information blocks, and after the LBT is successful, all the 4 information blocks in the information block group are transmitted, if remaining resources in the time interval are unable to completely transmit the 4 information blocks, the network device does not transmit information blocks in this time interval. For another example, LBT detection always fails, and when the remaining resources in the time interval are unable to completely transmit the 4 information blocks, the network device stops the LBT detection and does not transmit information blocks in the time interval.

In another implementation, the network device transmits a part of the information blocks in the information block group or does not transmit information block at a time interval. For example, the information block group of a cell contains 4 information blocks, and after the LBT is successful, remaining resources in the time interval may only be able to transmit one information block, and the network device only transmits one information block in the information block group (such as a first information block, or a last information block, etc.); if all the LBT detection fails within the time interval, the network device does not transmit information block within the time interval. Furthermore, in this implementation, the network device transmits control information, the control information being used to indicate information blocks in the information block group that are not transmitted by the network device in the time interval, or instruct the terminal equipment not to report a measurement result in the time interval, the measurement result being a measurement result of one of radio resource management (RRM), radio link measurement and channel state measurement. The control information may be common control information, that is, all terminal equipments served by the cell may receive the common control information, or the control information may be group common control information, that is, only a group of terminal equipments in terminal equipments served by the cell may receive the control information. In this implementation, as long as there is a resource for transmitting an information block within the time interval, the network device will transmit the information block, which may increase a possibility of access of a terminal equipment, notify the terminal equipment via the control information that the information blocks are not completely transmitted in the time interval, and effectively avoid a measurement error of the terminal equipment in a connected state.

According to this embodiment, in a time interval, each information block may have at least two candidate resources for transmitting the information block, and the information block may be transmitted on one of the at least two candidate resources; wherein the number of candidate resources and a time-frequency position of each information block may be preset. As each information block may have at least two candidate resources, it is still possible to use other candidate resources to transmit the information block when a part of candidate resources are unable to be used to transmit the information block due to LBT failure, hence, a possibility of transmitting the information block may be increased, thereby increasing a possibility of completely transmitting all the information blocks in the cell; and by indicating candidate resources actually used to transmit the information block via the indication information, it is possible to determine a candidate resource on which the information block is transmitted, thereby facilitating obtaining time-frequency information of the candidate resource.

In this embodiment, the indication information may be carried in the information block transmitted by the network device. Therefore, the network device may transmit the indication information in transmitting the information block, that is, step 401 is executed by transmitting the information block by the network device. Furthermore, the indication information may also be carried in other information, that is, in addition to the action of transmitting the information block, the network device also executes step 401 to transmit the indication information.

The candidate resources and indication information of this embodiment shall further be described below.

In a first implementation, the information blocks may have at least two candidate resources.

In this implementation, time domain intervals between candidate starting symbols may be equal or unequal, the candidate starting symbols may be orthogonal frequency division multiplexing (OFDM) symbols having predetermined index values in a time interval. Units of the time domain intervals may be an integer number of OFDM symbols, an integer number of subframes, milliseconds, or the information block.

In this implementation, the indication information includes: identification information of a candidate starting symbol of at least two candidate starting symbols of a first information block in the at least one information block, wherein the first information block may refer to an information block with a minimal index value in the information block group.

For example, when time domain intervals between neighboring candidate starting symbols are equal, the identification information of the candidate starting symbols may be the number of the time domain intervals between the candidate starting symbols and a first candidate starting symbol. Therefore, according to the number of time domain intervals, sizes of the time domain intervals and the first candidate starting symbol in the candidate starting symbols, index values of the candidate starting symbols in all symbols in the time interval may be determined; or, when the identification information of the candidate starting symbols is orthogonal frequency division multiplexing (OFDM) symbols having predetermined index values in a time interval, the identification information of the candidate starting symbols may be sequence numbers of the candidate starting symbols in all candidate starting symbols.

FIG. 5 is a schematic diagram of the candidate starting symbols in the first implementation. As shown in FIG. 5, there are 4 information blocks in the information block group, namely, information block 0, information block 1, information block 2 and information block 3, wherein information block 0 is the first information block.

As shown in FIG. 5, information block 0 has 5 candidate starting symbols, which are starting symbols 0~4, respectively.

The network device may perform LBT detection before the candidate starting symbols. When the channel is in an idle state, that is, LBT is successful, the network device transmits the first information block starting from the candidate starting symbols, and the indication information is set to be identification information of the candidate starting symbol starting to transmit the first information block.

In this implementation, after transmitting the first information block, the network device may continue to transmit other information blocks in an order of the index values of the information blocks, the order of the index values of the information blocks being, for example, an ascending order to the index values.

For example, in FIG. 5, the network device detects that the LBT is successful before candidate starting symbol 2. Therefore, the network device sequentially transmits information blocks 0-3 starting from candidate starting symbol 2, and identification information of candidate starting symbol 2 is taken as the indication information.

In a mode of transmitting the information blocks, there may exist a predetermined mapping relationship between the information blocks, that is, relative positions between starting symbols of different information blocks have predetermined values. Hence, after the terminal equipment detects an information block, it acquires time synchronization via the identification information of the candidate starting symbols transmitted by the network device and the predetermined mapping relationship between the information blocks.

In a particular example, the predetermined mapping relationship may be set by, for example, the default correspondence between the information blocks and the transmission resources shown in FIG. 1, that is, in the default correspondence, the information blocks correspond to the transmission resources, so that the relative positional relationships between the transmission resources of the information blocks are also set.

For example, when the time domain intervals of neighboring candidate starting symbols are equal, the identification information of the candidate starting symbols is the number of time domain intervals between the candidate starting symbols and the first candidate starting symbol, assuming that a size of a time domain interval between neighboring candidate starting symbols is 4 symbols, the terminal equipment detects information block 3, and the indication information is that the number of the time domain interval between candidate starting symbol 2 and the first candidate starting symbol is 2; if a starting symbol of a resource used to transmit information block 3 in the default correspondence (i.e. a default relationship when the information block group is transmitted starting from the first candidate starting symbol) is symbol 6 of slot 1, the terminal equipment adds 2×4=8 (i.e. the number of time domain intervals × a size of a time domain interval) symbols to the symbol index values in the default correspondence, so as to determine an index of the first symbol of the resource actually transmitting the information block 3 and an index of a slot where the symbol is located, so as to obtain downlink synchronization.

Figure 6:
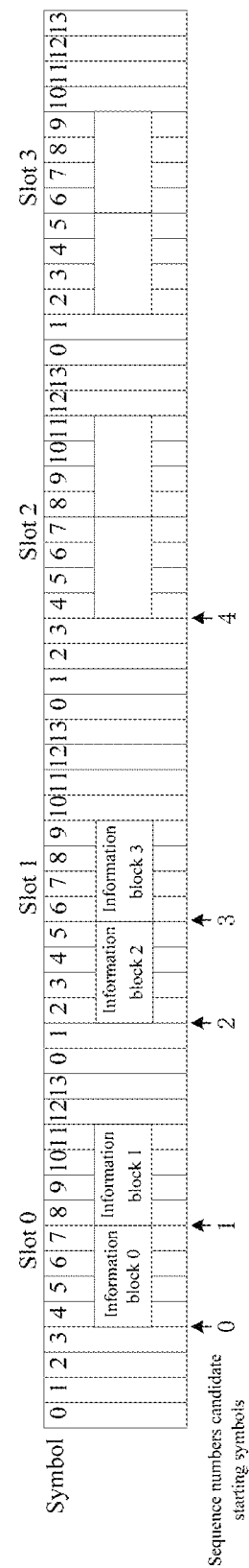
FIG. 6 is a schematic diagram of candidate starting symbols.

For another example, when the identification information of the candidate starting symbols is sequence numbers of the candidate starting symbols in all the candidate starting symbols, the candidate starting symbols being, for example, as shown in FIG. 6, 5 candidate starting symbols in a time interval are respectively defined as OFDM symbols in the time interval with respective index values 4, 8, 16, 20 and 31 (i.e. symbols 4, 8 in slot 0, symbols 2, 6 in slot 1, and symbol 4 in slot 2, in the time interval), and a size of the indication information is of 3 bits, indicating one of 0-4 candidate starting symbols; assuming that the terminal equipment detects information block 3, the 3 bits of the indication information are '000', indicating a sequence number 0 of the candidate starting symbol in all the candidate starting symbols, then the terminal equipment may correspondingly determine based on sequence number that an index value of a first symbol of the resource actually transmitting information block 0 is 4, and determine an OFDM symbol index value of the first symbol of information block 3 and an index of a slot where the symbol is located according to a default relationship between information block 3 and information block 0, so as to obtain the downlink synchronization.

In another particular example, the number of symbols between resources of different information blocks may be directly set to represent the predetermined mapping relationship.

Figure 7:
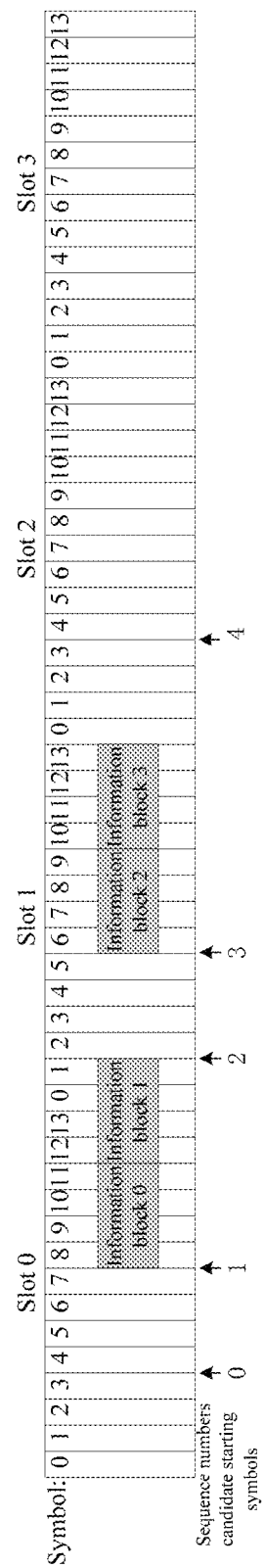
FIG. 7 is a schematic diagram of a predetermined mapping relationship between information blocks.

For example, FIG. 7 is a schematic diagram of the predetermined mapping relationship between the information blocks. As shown in FIG. 7, in the information block group, resources of information block 0 and information block 1 are consecutive, and there exists no interval symbol therebetween; resources of information block 1 and information block 2 are spaced apart by 4 symbols; and resources of information block 2 and information block 3 are consecutive, and there exists no interval symbol therebetween.

As shown in FIG. 7, when the network device detects that the channel is in an idle state at candidate starting symbol 1, the information blocks in the information block group are transmitted starting from candidate starting symbol 1 according to a predetermined number of symbols between the information blocks, and when the terminal equipment detects an information block, it obtains time synchronization via the identification information of the candidate starting symbol transmitted by the network device and the number of symbols between the resources of different information blocks. Reference may be made to the foregoing example for a particular mode, which shall not be described herein any further.

In another mode of transmitting the information blocks, the information blocks may be transmitted on predetermined time-frequency resources. For example, within a time interval, an integer number (such as greater than one) of time-frequency resources used to transmit information blocks may be predefined, the time-frequency resources corresponding to time one-to-one, wherein in the integer number (such as greater than one) of time-frequency resources, starting symbols of former N time-frequency resources may be set to be candidate starting symbols, that is. N candidate starting symbols are preset, N being a natural number greater than 1. Starting from a candidate starting symbol, the information blocks in the information block group are sequentially transmitted on the time-frequency resources of a number equal to the number of consecutive information blocks starting from the candidate starting symbol.

Figure 8:
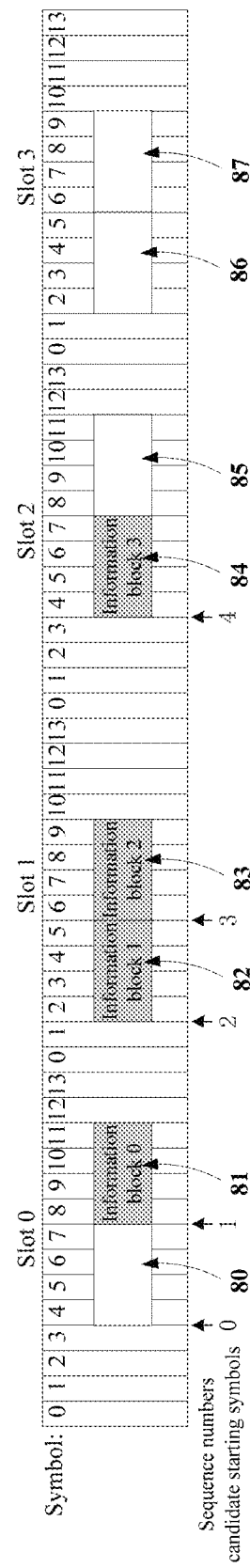
FIG. 8 is a schematic diagram of predetermined time-frequency resources.

FIG. 8 is a schematic diagram of predetermined time-frequency resources. As shown in FIG. 8, 80~87 are predetermined 8 time-frequency resources for transmitting information blocks in a time interval, and candidate starting symbols 0~4 correspond to starting symbols of the time-frequency resources 80~84 respectively; wherein a candidate starting symbol 0 is, for example, a symbol 4 of slot 0 in the time interval.

As shown in FIG. 8, the network device may start to transmit the information block group from candidate starting symbol 1, that is, four information blocks 0, 1, 2 and 3 in the information block group are transmitted on time-frequency resources 81, 82, 83 and 84, respectively. After the terminal equipment receives, for example, information block 2, according to the indication information (that is, the starting symbol for transmitting the information block group is candidate starting symbol 1), it may determine information block 2 is transmitted on which predetermined time-frequency resource in the time interval, such as 2+1=3 (that is, the index value of the information block+the identification information of the candidate starting symbol=the sequence number of the time-frequency resource), and obtain downlink synchronization according to a one-to-one correspondence between the third time-frequency resource 83 and the time.

In the first implementation, the indication information may be carried in a master system information block (MIB) of a PBCH in the information block transmitted by the network device or carried in system message block 1 (SIB1).

In this implementation, the indication information may also be denoted as a relative relationship between SSBs in the information block transmitted by the network device and other signals or channels, and the relative relationship may be, for example, a time domain or frequency domain mapping relationship. That is, different relative relationships between the SSBs and the other signals or channels may denote identification information of different candidate starting symbols. The other signals or channels may be channels or signals included in the information block, such as control resource set 0, or a channel state reference signal (CSI-RS) in the information block.

Figure 9:
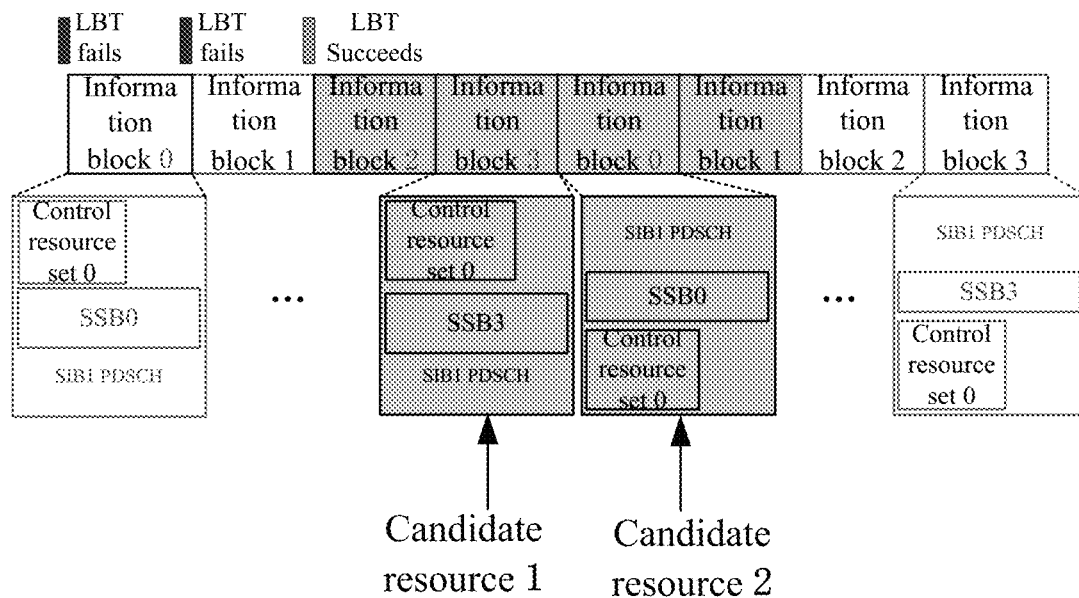
FIG. 9 is a schematic diagram of denoting indication information by using a relative relationship between SSBs and other signals or channels.

FIG. 9 is a schematic diagram of denoting the indication information by using the relative relationship between SSBs and other signals or channels. As shown in FIG. 9, a payload of the PBCH may include first indication information used for indicating time-frequency resources of the control resource set 0 (CORESET 0). In FIG. 9, when a frequency domain minimal resource block index of the control resource set 0 indicated by a payload of a PBCH of an information block (such as information block 0) is greater than a maximum value of a frequency index in a resource block occupied by an SSB (such as SSB0) in the information block, it indicates that the information block is transmitted on candidate resource 1 (for example, a starting symbol is the candidate starting symbol 1); and when a frequency domain maximum resource block index of the control resource set 0 indicated by a payload of a PBCH of an information block is less than a minimal value of a frequency index in a resource block occupied by an SSB (such as SSB3) in the information block, it indicates that the information block is transmitted on candidate resource 2 (for example, a starting symbol is the candidate starting symbol 1). The terminal equipment determines candidate resources according to a relative relationship between control resource set 0 and SSBs, and thus determines a transmission symbol and slot index of the received information block to obtain downlink synchronization.

In addition, in FIG. 9, after the LBT is successful, the information blocks are transmitted in the order of information block 2, information block 3, information block 0 and information block 1. However, it is not limited thereto, and in FIG. 9, it may also be that after the LBT is successful, the information blocks are transmitted in the order of information block 0, information block 1, information block 2 and information block 3.

In a second implementation, a time interval may include an integer number of predetermined first time-frequency resources for transmitting information blocks, each first time-frequency resource including one or more symbols. The number of the integer number of predetermined first time-frequency resources in the time interval may be greater than the number of information blocks in the information block group of the cell.

In this implementation, the at least two candidate resources are at least two first time-frequency resources in the integer number of first time-frequency resources used for transmitting information blocks having identical index value identification, that is, the information blocks having identical index value identification (such as information blocks 2) may be transmitted on at least two first time-frequency resources, and the at least two time-frequency resources are the at least two candidate resources of the information blocks (such as information blocks 2).

In a particular example, the indication information includes identification information of a candidate symbol actually transmitting the information blocks in the at least two candidate resources.

Figure 10:
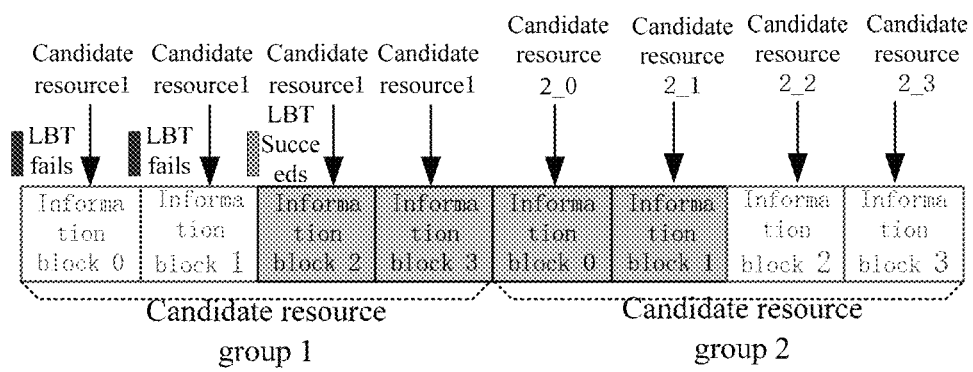
FIG. 10 is a schematic diagram of first time-frequency resources and candidate resources.

FIG. 10 is a schematic diagram of first time-frequency resources and candidate resources. As shown in FIG. 10, the candidate resources correspond to a time-frequency resource. Each information block (such as any one of information blocks 0-3) includes two candidate resources (i.e. candidate resource 1 and candidate resource 2), wherein the four candidate resources 1 in FIG. 10 may constitute a candidate resource group 1, and candidate resources 2 may constitute a candidate resource group 2.

As shown by darker information blocks in FIG. 10, after the LBT is successful, the network device transmits the information blocks in an order of information block 2, information block 3, information block 0 and information block 1, indication information of the information blocks including identification information of candidate resources transmitting the information blocks in at least two candidate resources of the information blocks. For example, for information block 3, the indication information is identification information "1" of candidate resource 1 in two candidate resources of information block 3 (i.e. candidate resource 1 and candidate resource 2); for another example, for information block 0, the indication information is identification information "2" of candidate resource 2 in two candidate resources of information block 0 (i.e. candidate resource 1 and candidate resource 2).

In this particular example, the terminal equipment may obtain downlink synchronization via a correspondence between the candidate transmission position and the time. For example, the terminal equipment detects information block 1 in FIG. 10, the indication information indicates that the information block is transmitted on candidate resource 2 of the candidate resources, and the terminal equipment obtains downlink synchronization via a starting symbol and slot sequence number of information block 1 of candidate resource 2.

In the particular example corresponding to, for example, FIG. 10, the indication information may be carried in a master system information block (MIB) of a PBCH in the information block transmitted by the network device or carried in system message block 1 (SIB1): or, the indication information may be denoted as a relative relationship between SSBs in the information block transmitted by the network device and other signals or channels. That is, different relative relationships between the SSBs and the other signals or channels may denote identification information of different candidate starting symbols. Reference may be made to the description in FIG. 9 for details.

In another particular example of the second implementation, the indication information may include: identification information of a first candidate resource to which a candidate resource of the information block corresponds in the integral number of first time-frequency resources.

Figure 11:
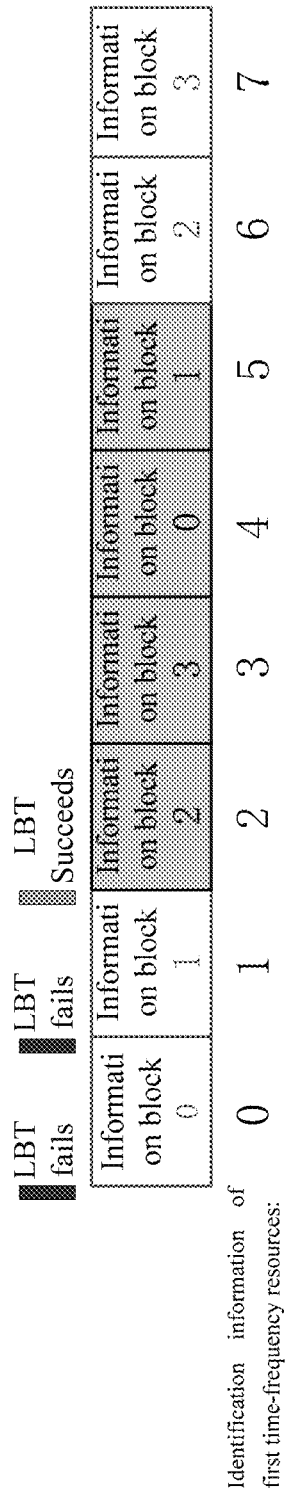
FIG. 11 is another schematic diagram of the first time-frequency resources and the candidate resources.

FIG. 11 is another schematic diagram of the first time-frequency resources and the candidate resources. As shown in FIG. 11, it is assumed that there are 8 first time-frequency resources preset in the time interval, identification information of which is 0-7, respectively, and each candidate resource corresponds to a time-frequency resource. Each information block (such as any one of information blocks 0-3) includes two candidate resources. For example, first time-frequency resources 0 and 4 are candidate resources of information block 0, first time-frequency resources 1 and 5 are candidate resources of information block 1, first time-frequency resources 2 and 6 are candidate resources of information block 2, and first time-frequency resources 3 and 7 are candidate resources of information block 3.

As shown by darker information blocks in FIG. 11, after the LBT is successful, the network device transmits the information blocks in an order of information block 2, information block 3, information block 0 and information block 1, indication information of the information blocks including identification information of first time-frequency resources to which the candidate resources transmitting the information blocks correspond. For example, for information block 3, the indication information is identification information "3" of time-frequency resource 3 transmitting information block 3; and for another example, for information block 0, the indication information is identification information "4" of time-frequency resource 4 transmitting information block 0.

In this particular example, the terminal equipment may obtain downlink synchronization via a correspondence between the identification information of the first time-frequency resources and time; and furthermore, the terminal equipment may perform modulus division on the identification information of the first time-frequency resources and the number of information blocks in the information block group of the cell, so as to obtain an index value of the received information block.

For example, the terminal equipment detects a transmitted information block shown in FIG. 11, obtains via a DMRS and/or PBCH payload that a candidate resource for transmitting the information block is first time-frequency resource 5, and obtains a symbol corresponding to first time-frequency resource 5 according to first time-frequency resource 5 and a slot index, so as to obtain downlink synchronization. And furthermore, the terminal equipment may determine that the number of information blocks contained in the cell information block group of the cell is L=4 via a carrier frequency and/or a subcarrier spacing, or that a default value of the number of information blocks contained in a information block group of a cell of an unlicensed frequency band is L=4. Therefore, the index of the information block may be obtained through calculation as 5 mod 4=1, and such measurement functions as RRM, and RLM, etc., may be executed by using the index 1 of the information block.

In the particular example corresponding to, for example, FIG. 11, the indication information may be indicated by a payload of a demodulation reference signal (DMRS) sequence and/or physical broadcast channel (PBCH) of a physical broadcast channel (PBCH) in the information block. For example, when the identification information of the first time-frequency resource is less than or equal to 8, the indication information may be indicated by the DMRS or PBCH: and when the identification information of the first time-frequency resource is greater than 8, the indication information may be indicated by both the DMRS and PBCH.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 2

Embodiment 2 of this disclosure provides a signal reception method, which may be carried out by a terminal equipment.

Figure 12:
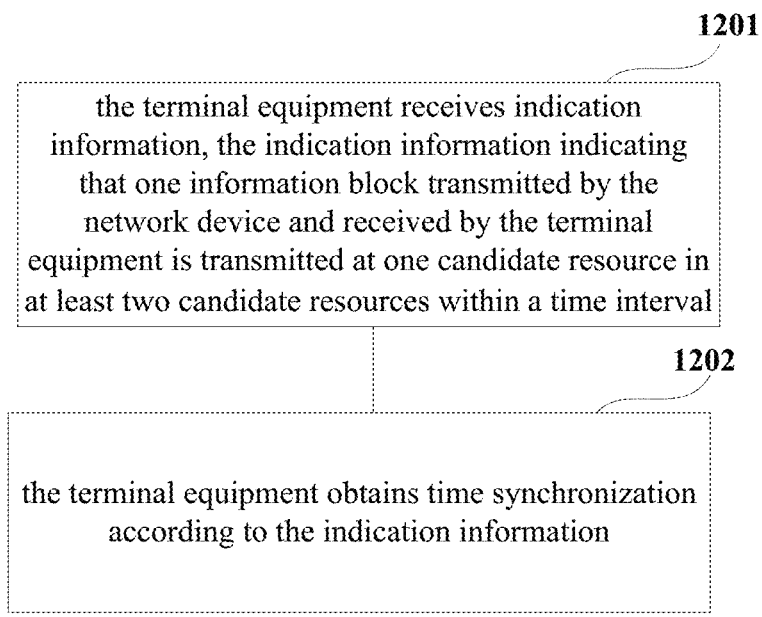
FIG. 12 is a schematic diagram of the signal reception method of Embodiment 2.

FIG. 12 is a schematic diagram of the signal reception method of Embodiment 2 of this disclosure. As shown in FIG. 12, the method includes:

step 1201: the terminal equipment receives indication information, the indication information indicating one candidate resource in at least two candidate resources within a time interval, one information block transmitted by the network device is transmitted at the one candidate resource; and step 1202: the terminal equipment obtains time synchronization according to the indication information.

In this embodiment, the information block at least includes a synchronization signal/physical broadcast channel block (SS/PBCH Block, SSB).

In a first implementation of this embodiment, the network device transmits at least one information block in a time interval, the at least one information block including the information block received by the terminal equipment. In this implementation, information block(s) in the at least one information block may have at least two candidate resources.

Regarding description of the first implementation, reference may be made to the description of the first implementation in Embodiment 1, for example:

in this implementation, the indication information is used to indicate that a candidate starting symbol of the first information block of the at least one information block is one of the at least two candidate starting symbols, for example, the indication information includes identification information of the candidate starting symbol;

in this implementation, time domain intervals between neighboring candidate starting symbols are equal, and a unit of the time domain intervals is one of an orthogonal frequency division multiplexing (OFDM) symbol, a subframe, a millisecond, and the information block;

in this implementation, the terminal equipment obtains time synchronization via the indication information, a size of the time domain interval, and an index value of the information block;

in this implementation, the identification information of the candidate starting symbol includes identification information of an OFDM symbol with a predetermined index value in the time interval, and the terminal equipment obtains time synchronization via index values taken as the indication information and the information block;

in this implementation, the network device may start from candidate starting symbol to sequentially transmit the at least one information block on predetermined time-frequency resources for transmitting information blocks within the time interval, in which case the terminal equipment may further need to obtain time synchronization with reference to a relationship between the predetermined time-frequency resources and time;

in this implementation, the network device may also start from the candidate starting symbol to transmit the at least one information block according to a predetermined mapping relationship between the at least one information block, in which case the terminal equipment needs further to obtain time synchronization with reference to the predetermined mapping relationship;

in this implementation, the indication information may be carried in a master system information block (MIB) of a PBCH or carried in system message block 1 (SIB1); or, the indication information may be denoted as a relative time domain or frequency domain relationship between SSBs in the information block and other signals or channels.

In the second implementation of this embodiment, a time interval includes an integer number of first time-frequency resources used for transmitting information blocks, and the at least two candidate resources are at least two first time-frequency resources in the integer number of first time-frequency resources used for transmitting information blocks with identical index value identification. In this implementation, the terminal equipment may obtain time synchronization according to a correspondence between indication information and the time.

Regarding description of the second implementation, reference may be made to the description of the second implementation in Embodiment 1, for example:

in a particular example of this implementation, the indication information may include identification information of the candidate resource in the at least two candidate resources;

in this example, the terminal equipment may determine the first time-frequency resource for transmitting the information block according to the identification information of the candidate resource and an index value of the received information block, thereby determining a starting symbol and slot sequence number of the first time-frequency resource and obtaining downlink synchronization;

in this example, the indication information is carried in a master system information block (MIB) of a PBCH or system information block 1 (SIB1), or the indication information is denoted as a relative time-domain or frequency-domain mapping relationship between SSBs in the information block and other signals or channels.

In another particular example of this implementation, the indication information may also include identification information of the first time-frequency resource to which a candidate resource corresponds in the integer number of first time-frequency resources.

In this example, the terminal equipment may determine the first time-frequency resource for transmitting the information block according to the identification information of the first time-frequency resource, thereby determining a starting symbol and slot sequence number of the first time-frequency resource and obtaining downlink synchronization. Furthermore, in this example, the terminal equipment may obtain an index value of the received information block according to the indication information and the number of information blocks contained in the information block group of the cell, such as obtaining the index value of the information block by performing modulus division on them.

In this example, the indication information may be indicated by a DMRS sequence and/or a payload of a PBCH in the one information block.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 3

Embodiment 3 of this disclosure provides a signal transmission apparatus, provided in a network device. As a principle of the apparatus for solving problems is similar to that of the method in Embodiment 1, reference may be made to the implementation of the method in Embodiment 1 for implementation of this apparatus, with identical contents being going to be described herein any further.

Figure 13:
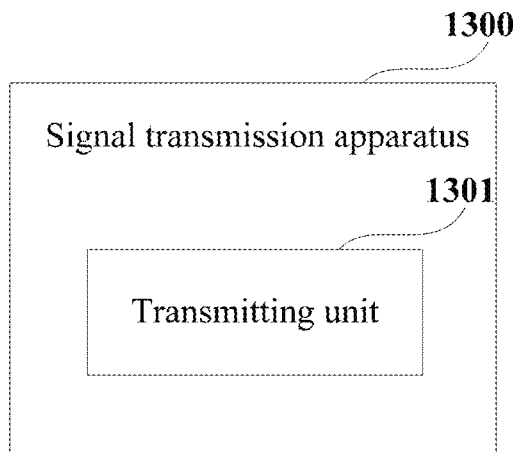
FIG. 13 is a schematic diagram of the signal transmission apparatus of Embodiment 3.

FIG. 13 is a schematic diagram of the signal transmission apparatus of Embodiment 3. As shown in FIG. 13, a signal transmission apparatus 1300 includes:

a transmitting unit 1301 configured to transmit indication information indicating one candidate resource in at least two candidate resources within a time interval, one information block of at least one information block transmitted by the network device within the time interval is transmitted at the one candidate resource.

In this embodiment, the information block at least includes a synchronization signal/physical broadcast channel (PBCH) block (SSB).

In this embodiment, the information block includes: identification information of a candidate starting symbol of at least two candidate starting symbols of a first information block in the at least one information block.

In this embodiment, time domain intervals of neighboring candidate starting symbols are equal, a unit of the time domain intervals being one of an OFDM symbol, a subframe, a millisecond, and the information block.

In this embodiment, the candidate starting symbol is an OFDM symbol of a predetermined index value within the time interval.

In this embodiment, the network device transmits at least one information block within the time interval in a manner that starting from the candidate resource, the network device sequentially transmits the at least one information block on a predetermined time-frequency resource used for transmitting information block within the time interval.

In this embodiment, the network device transmits at least one information block within the time interval in a manner that starting from the candidate starting symbol, the network device transmits the at least one information block according to a predetermined mapping relationship between the at least one information block.

In this embodiment, the time interval includes an integral number of first time-frequency resources, the first time-frequency resources being used for transmitting the information block; and the at least two candidate resources are at least two of the integral number of first time-frequency resources used for transmitting the information block of the same index value identification.

In this embodiment, the indication information includes: identification information of the candidate resource in the at least two candidate resources.

In this embodiment, the indication information includes: identification information of the candidate resource to which the candidate resource corresponds in the integral number of first time-frequency resources.

In this embodiment, the indication information is carried in a master information block (MIB) of a PBCH in the information block, or is carried in a system information block 1 (SIB1).

In this embodiment, the indication information is expressed as a relative time domain or frequency domain mapping relationship between SSBs in the information block and other signals or channels.

In this embodiment, the indication information is indicated by a DMRS sequence and/or a payload of a PBCH in the one information block.

Reference may be made to corresponding steps in Embodiment 1 for detailed description of this embodiment, which shall not be described herein any further.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 4

Embodiment 4 of this disclosure provides a signal reception apparatus, provided in a terminal equipment. As a principle of the apparatus for solving problems is similar to that of the method in Embodiment 2, reference may be made to the implementation of the method in Embodiment 2 for implementation of this apparatus, with identical contents being going to be described herein any further.

Figure 14:
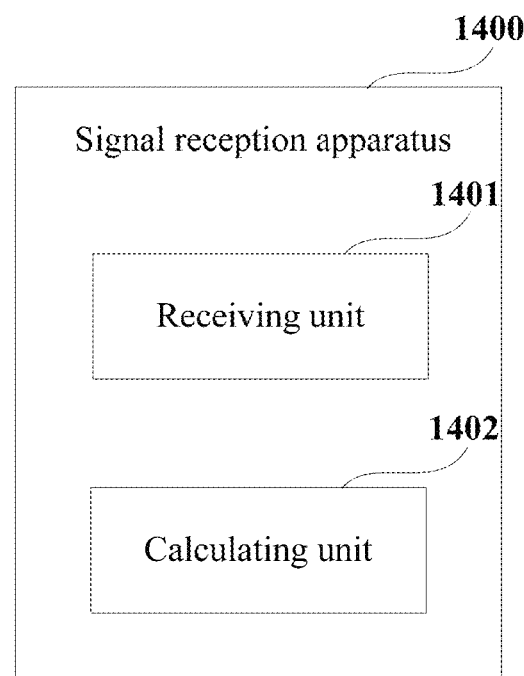
FIG. 14 is a schematic diagram of the signal reception apparatus of Embodiment 4.

FIG. 14 is a schematic diagram of the signal reception apparatus of Embodiment 4. As shown in FIG. 14, a signal reception apparatus 1400 includes:

a receiving unit 1401 configured to receive indication information transmitted by a network device, the indication information indicating one candidate resource in at least two candidate resources within a time interval, one information block transmitted by the network device is transmitted at the one candidate resource; and
a calculating unit 1402 configured to obtain time synchronization according to the indication information.

In this embodiment, the information block at least includes a synchronization signal/physical broadcast channel (PBCH) block (SSB).

In this embodiment, the network device transmits at least one information block within the time interval, the at least one information block including the one information block.

In this embodiment, the indication information includes: identification information of a candidate starting symbol of at least two candidate starting symbols of a first information block.

In this embodiment, time domain intervals of neighboring candidate starting symbols are equal, a unit of the time domain intervals being one of an orthogonal frequency division multiplexing (OFDM) symbol, a subframe, a millisecond, and the information block.

In this embodiment, the calculating unit obtains the time synchronization according to the indication information, sizes of the time domain intervals and an index value of the one information block.

In this embodiment, the candidate starting symbol is an OFDM symbol of a predetermined index value within the time interval; and the calculating unit obtains the time synchronization according to the indication information and the index value of the one information block.

In this embodiment, starting from the candidate resource, the network device sequentially transmits the at least one information block on a predetermined time-frequency resource used for transmitting information block within the time interval: and the calculating unit obtains the time synchronization according to the predetermined time-frequency resource.

In this embodiment, starting from the candidate starting symbol, the network device transmits the at least one information block according to a predetermined mapping relationship between the at least one information block; and the calculating unit obtains the time synchronization according to the predetermined mapping relationship.

In this embodiment, the time interval includes an integral number of first time-frequency resources used for transmitting the information block; and the at least two candidate resources are at least two of the integral number of first time-frequency resources used for transmitting the information block of the same index value identification.

In this embodiment, the indication information includes: identification information of the candidate resource in the at least two candidate resources.

In this embodiment, the indication information includes: identification information of the first time-frequency resource to which the candidate resource corresponds in the integral number of first time-frequency resources.

In this embodiment, the calculating unit obtains the time synchronization according to a correspondence between the indication information and time.

In this embodiment, the calculating unit obtains an index value of one information block according to the indication information and the number of information blocks contained in at least one information block transmitted by the network device within the time interval.

In this embodiment, the indication information is carried in a master information block (MIB) of a PBCH in the information block, or is carried in a system information block 1 (SIB1).

In this embodiment, the indication information is expressed as a relative time domain or frequency domain mapping relationship between SSBs in the information block and other signals or channels.

In this embodiment, the indication information is indicated by a DMRS sequence and/or a payload of a PBCH in the one information block.

Reference may be made to corresponding steps in Embodiment 1 for detailed description of this embodiment, which shall not be described herein any further.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 5

Embodiment 5 of this disclosure provides a terminal equipment. As a principle of the equipment for solving problems is similar to that of the method in Embodiment 2, reference may be made to the implementation of the method in Embodiment 2 for implementation of this equipment, with identical contents being going to be described herein any further.

Figure 15:
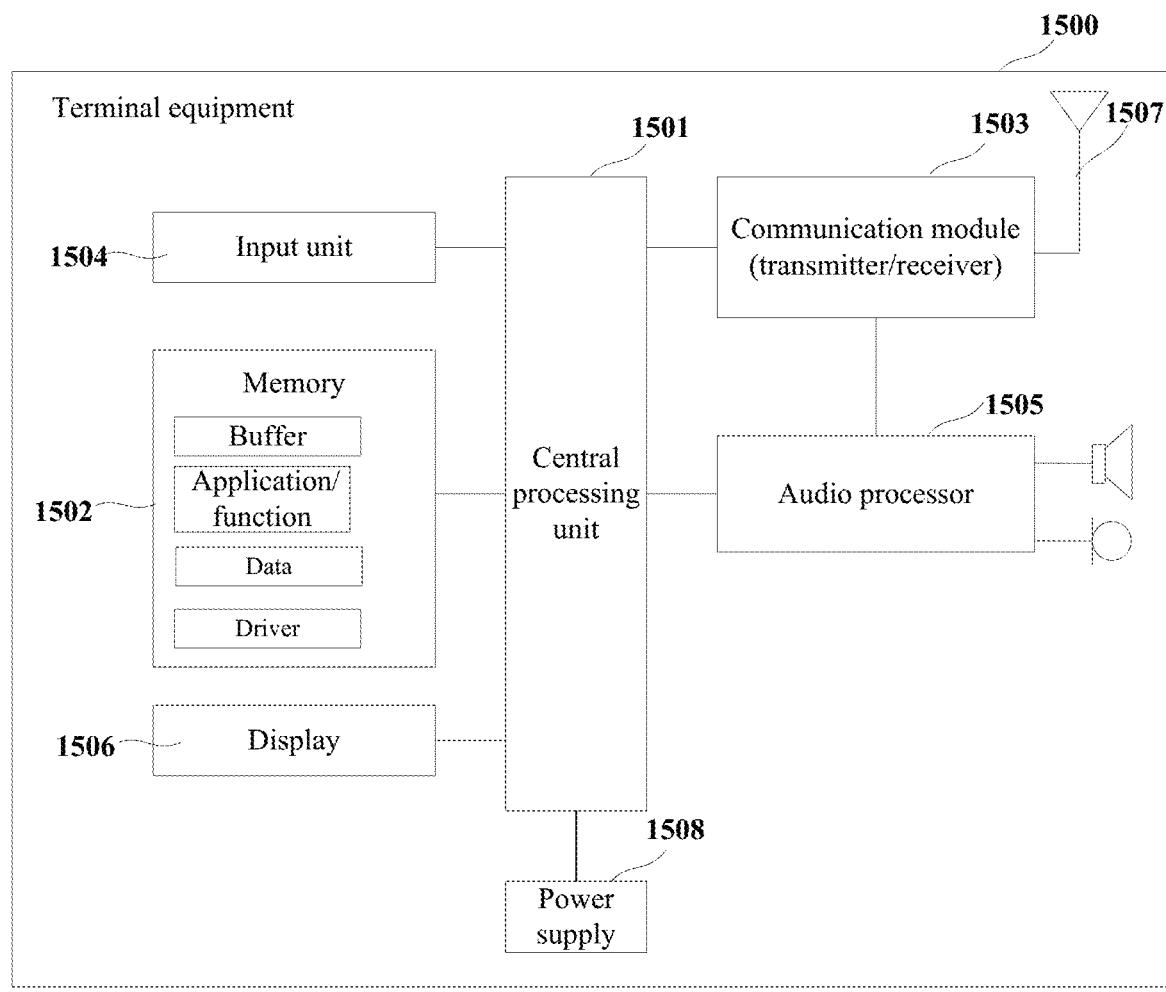
FIG. 15 is a schematic diagram of a structure of the terminal equipment of an embodiment of this disclosure.

FIG. 15 is a schematic diagram of a structure of the terminal equipment of an embodiment of this disclosure. As shown in FIG. 15, a terminal equipment 1500 may include a central processing unit (CPU) 1501 and a memory 1502, the memory 1502 being coupled to the central processing unit 1501. The memory 1502 may store various data, and furthermore, it may store a program for data processing, and execute the program under control of the central processing unit 1501, so as to instruct the terminal equipment according to received signaling.

In one implementation, the functions of the apparatus 1400 described in Embodiment 4 may be integrated into the central processing unit 1501 of the terminal equipment 1500; wherein the central processing unit 1501 may be configured to carry out the method described in Embodiment 2.

For example, the central processing unit 1501 may be configured to control so that the terminal equipment 1500 carries out the method described in Embodiment 2.

Furthermore, reference may be made to Embodiment 2 for other configurations of the central processing unit 1501, which shall not be described herein any further.

In another implementation, the apparatus 1400 and the central processing unit 1501 may be configured separately; for example, the apparatus 1400 may be configured as a chip connected to the central processing unit 1501, and the functions of the apparatus 1400 are executed under control of the central processing unit 1501.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 6

The embodiment of this disclosure provides a network device. As a principle of the device for solving problems is similar to that of the method in Embodiment 1, reference may be made to the implementation of the method in Embodiment 1 for implementation of this device, with identical contents being going to be described herein any further.

Figure 16:
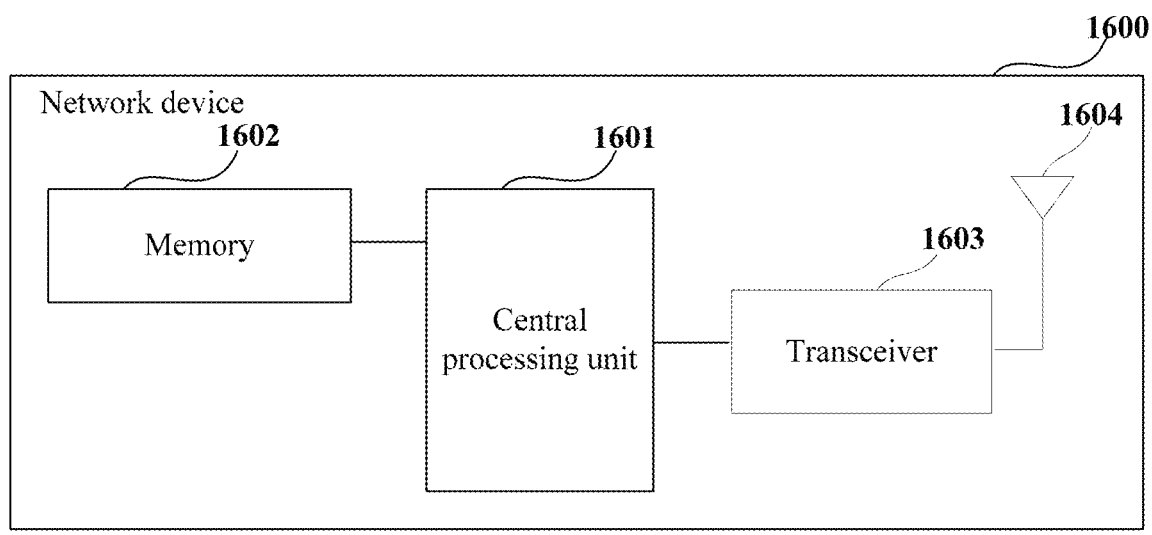
FIG. 16 is a schematic diagram of a structure of the network device of an embodiment of this disclosure.

FIG. 16 is a schematic diagram of a structure of the network device of the embodiment of this disclosure. As shown in FIG. 16, a network device 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601.

In one implementation, the functions of the apparatus 1300 may be integrated into the central processing unit 1601; wherein the central processing unit 1601 may be configured to carry out the method in Embodiment 1.

For example, the central processing unit 1601 may be configured to control so that the network device 1600 carries out the method described in Embodiment 1.

Furthermore, reference may be made to Embodiment 1 for other configurations of the central processing unit 1601, which shall not be described herein any further.

In another implementation, the apparatus 1300 and the central processing unit 1601 may be configured separately; for example, the apparatus 1300 may be configured as a chip connected to the central processing unit 1601, such as the units shown in FIG. 16, and the functions of the apparatus 1300 are executed under control of the central processing unit 1601.

Furthermore, as shown in FIG. 16, the network device 1600 may include a transceiver 1603, and an antenna 1604, etc. Functions of the above components are similar to those in the related art, and shall not be described herein any further. It should be noted that the network device 1600 does not necessarily include all the parts shown in FIG. 16, and furthermore, the network device 1600 may include parts not shown in FIG. 16, and the related art may be referred to.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

Embodiment 7

The embodiment of this disclosure provides a communication system, at least including the terminal equipment 1500 described in Embodiment and the network device 1600 described in Embodiment 6. Contents of embodiments 5 and 6 are incorporated herein, and shall not be described herein any further.

According to this embodiment, the transmission resources of the information blocks are indicated by the indication information, hence, even though the default correspondence between the information block indices and the transmission resources is to be changed, the transmission resources to which the information blocks correspond may be determined, and the terminal equipment is facilitated in downlink synchronization.

An embodiment of this disclosure provides a computer readable program, which, when executed in a transmitting device or a network device, will cause the transmitting device or the network device to carry out the method described in Embodiment 1.

An embodiment of this disclosure provides a computer storage medium, including a computer readable program, which will cause a transmitting device or a network device to carry out the method described in Embodiment 1.

An embodiment of this disclosure provides a computer readable program, which, when executed in a receiving device or a terminal equipment, will cause the receiving device or the terminal equipment to carry out the method described in Embodiment 2.

An embodiment of this disclosure provides a computer storage medium, including a computer readable program, which will cause a receiving device or a terminal equipment to carry out the method described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 13 and 14 may either correspond to software modules of procedures of a computer program, or correspond to hardware modules. Such software modules may respectively correspond to the steps shown in FIGS. 4 and 12. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 13 and 14 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 5 and 6 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

Following supplements are further provided in this disclosure.

1. A signal transmission apparatus, provided in a network device, the apparatus including:
   a transmitting unit configured to transmit indication information indicating one candidate resource in at least two candidate resources within a time interval, wherein, one information block of at least one information block transmitted by the network device within the time interval is transmitted at the one candidate resource.

2. The apparatus according to supplement 1, wherein.
   the information block at least includes a synchronization signal/physical broadcast channel (PBCH) block (SSB).

3. The apparatus according to supplement 1 or 2, wherein,
   the indication information includes: identification information of a candidate starting symbol of at least two candidate starting symbols of a first information block in the at least one information block.

4. The apparatus according to supplement 3, wherein,
   time domain intervals of neighboring candidate starting symbols are equal, a unit of the time domain intervals being one of an OFDM symbol, a subframe, a millisecond, and the information block.

5. The apparatus according to supplement 3, wherein.
   the candidate starting symbol is an OFDM symbol of a predetermined index value within the time interval.

6. The apparatus according to supplement 3, wherein,
   the network device transmits at least one information block within the time interval in a manner that,
   starting from the candidate resource, the network device sequentially transmits the at least one information block on a predetermined time-frequency resource used for transmitting information block within the time interval.

7. The apparatus according to supplement 3, wherein,
   the network device transmits at least one information block within the time interval in a manner that,
   starting from the candidate starting symbol, the network device transmits the at least one information block according to a predetermined mapping relationship between the at least one information block.

8. The apparatus according to supplement 1 or 2, wherein.
   the time interval includes an integral number of first time-frequency resources, the first time-frequency resources being used for transmitting the information block;
   and the at least two candidate resources are at least two of the integral number of first time-frequency resources used for transmitting the information block of the same index value identification.

9. The apparatus according to supplement 8, wherein.
   the indication information includes: identification information of the candidate resource in the at least two candidate resources.

10. The apparatus according to supplement 8, wherein,
    the indication information includes: identification information of a first time-frequency resource to which the one candidate resource corresponds in the integral number of first time-frequency resources.

11. The apparatus according to supplement 3 or 9, wherein,
the indication information is carried in a master information block (MIB) of a PBCH in the one information block, or is carried in a system information block 1 (SIB1).

12. The apparatus according to supplement 3 or 9, wherein,
the indication information is expressed as a relative time domain or frequency domain mapping relationship between SSBs in the information block and other signals or channels.

13. The apparatus according to supplement 10, wherein,
the indication information is indicated by a DMRS sequence and/or a payload of a PBCH in the one information block.

14. A signal reception apparatus, provided in a terminal equipment, the apparatus including:
a receiving unit configured to receive indication information transmitted by a network device, the indication information indicating one candidate resource in at least two candidate resources within a time interval, wherein, one information block transmitted by the network device is transmitted at one candidate resource; and
a calculating unit configured to obtain time synchronization according to the indication information.

15. The apparatus according to supplement 14, wherein,
the information block at least includes a synchronization signal/physical broadcast channel (PBCH) block (SSB).

16. The apparatus according to supplement 14, wherein,
the network device transmits at least one information block within the time interval, the at least one information block including the one information block.

17. The apparatus according to supplement 16, wherein,
the indication information includes: identification information of a candidate starting symbol of at least two candidate starting symbols of a first information block in the at least one information block.

18. The apparatus according to supplement 17, wherein,
time domain intervals of neighboring candidate starting symbols are equal, a unit of the time domain intervals being one of an orthogonal frequency division multiplexing (OFDM) symbol, a subframe, a millisecond, and the information block.

19. The apparatus according to supplement 18, wherein,
the identification information of the candidate starting symbol includes: the number of time domain intervals between the candidate starting symbol and a first candidate starting symbol in the at least two candidate starting symbols;
and the calculating unit obtains the time synchronization according to the indication information, sizes of the time domain intervals and an index value of the one information block.

20. The apparatus according to supplement 17, wherein,
the at least one candidate starting symbol is an OFDM symbol of a predetermined index value within the time interval;
the identification information of the candidate starting symbol includes: identification information of the OFDM symbol of a predetermined index value;
and the calculating unit obtains the time synchronization according to the indication information and the index value of the one information block.

21. The apparatus according to supplement 19 or 20, wherein,
starting from the candidate resource, the network device sequentially transmits the at least one information block on a predetermined time-frequency resource used for transmitting information block within the time interval;
and the calculating unit obtains the time synchronization according to the predetermined time-frequency resource.

22. The apparatus according to supplement 19 or 20, wherein,
starting from the candidate starting symbol, the network device transmits the at least one information block according to a predetermined mapping relationship between the at least one information block;
and the calculating unit obtains the time synchronization according to the predetermined mapping relationship.

23. The apparatus according to supplement 14, wherein,
the time interval includes an integral number of first time-frequency resources used for transmitting the information block:
and the at least two candidate resources are at least two of the integral number of first time-frequency resources used for transmitting the information block of the same index value identification.

24. The apparatus according to supplement 23, wherein,
the indication information includes: identification information of the candidate resource in the at least two candidate resources.

25. The apparatus according to supplement 23, wherein,
the indication information includes: identification information of the first time-frequency resource to which the candidate resource corresponds in the integral number of first time-frequency resources.

26. The apparatus according to supplement 24 or 25, wherein,
the calculating unit obtains the time synchronization according to a correspondence between the indication information and time.

27. The apparatus according to supplement 25, wherein,
the calculating unit obtains an index value of one information block according to the indication information and the number of information blocks contained in at least one information block transmitted by the network device within the time interval.

28. The apparatus according to supplement 16 or 24, wherein,
the indication information is carried in a master information block (MIB) of a PBCH in the one information block, or is carried in a system information block 1 (SIB1).

29. The apparatus according to supplement 16 or 24, wherein the indication information is expressed as a relative time domain or frequency domain mapping relationship between SSBs in the information block and other signals or channels.

30. The apparatus according to supplement 25, wherein,
the indication information is indicated by a DMRS sequence and/or a payload of a PBCH in the one information block.

31. A communication system, including a network device and a terminal equipment;
wherein, the network device includes the transmission apparatus as described in any one of supplements 1-13, and the terminal equipment includes the reception apparatus as described in any one of supplements 14-30.

What is claimed is:

1. A signal transmission apparatus, provided in a network device, the apparatus comprising:
a transmitter configured to transmit index of a first time-frequency resource in integer number of first time-frequency resources used for transmitting synchronization signal/physical broadcast channel (PBCH) block (SSB) in a time interval,
wherein one first time-frequency resource is used for transmitting one SSB and the integer number of first time-frequency resources includes at least two first time-frequency resources used for transmitting SSBs identified by a same SSB index, the first time-frequency resource is one of the at least two first time-frequency resources and the index of the first time-frequency resource is carried by a DMRS sequence and/or a PBCH payload in an SSB transmitted using the first time-frequency resource.

2. A signal reception apparatus, provided in a terminal equipment, the apparatus comprising:
a memory that stores a plurality of instructions; and
a processor coupled to the memory and configured to execute the instructions to:
receive index transmitted by a network device, the index indicating a first time-frequency resource in integer number of first time-frequency resources used for transmitting synchronization signal/physical broadcast channel (PBCH) block (SSB) in a time interval, wherein one first time-frequency resource is used for transmitting one SSB and the integer number of first time-frequency resources includes at least two first time-frequency resources used for transmitting SSBs identified by a same SSB index, the first time-frequency resource is one of the at least two first time-frequency resources and the index of the first time-frequency resource is carried by a DMRS sequence and/or a PBCH payload in an SSB transmitted using the first time; and
obtain time synchronization according to the index.

3. The apparatus according to claim 2, wherein,
the processor is further configured to obtain the time synchronization according to the index of the first time-frequency resource and a correspondence between the index of the first time-frequency resource and time.

4. The apparatus according to claim 2, wherein the processor is further configured to obtain an SSB index value of the SSB transmitted using the first time-frequency resource according to the index of the first time-frequency resource and the number of SSBs transmitted by the network device within the time interval.

5. A communication system, comprising:
a network device; and
a terminal equipment;
wherein, the network device comprises a transmission apparatus including a transmitter configured to transmit index of a first time-frequency resource in integer number of first time-frequency resources used for transmitting synchronization signal/physical broadcast channel (PBCH) block (SSB) in a time interval, wherein one first time-frequency resource is used for transmitting one SSB and the integer number of first time-frequency resources includes at least two first time-frequency resources used for transmitting SSBs identified by a same SSB index, the first time-frequency resource is one of the at least two first time-frequency resources and the index of the first time-frequency resource is carried by a DMRS sequence and/or a PBCH payload in an SSB transmitted using the first time-frequency resource, and
the terminal equipment comprises a reception apparatus including
a memory that stores a plurality of instructions; and
a processor coupled to the memory and configured to execute the instructions to:
receive index transmitted by a network device, the index indicating a first time-frequency resource in integer number of first time-frequency resources used for transmitting synchronization signal/physical broadcast channel (PBCH) block (SSB) in a tire interval, wherein one first time-frequency resource is used for transmitting one SSB and the integer number of first time-frequency resources includes at least two first time-frequency resources used for transmitting SSBs identified by a same SSB index, the first time-frequency resource is one of the at least two first time-frequency resources and the index of the first time-frequency resource is carried by a DMRS sequence and/or a PBCH payload in an SSB transmitted using the first time-frequency resource; and
obtain time synchronization according to the index.

* * * * *